United States Patent
Alvarado et al.

(10) Patent No.: US 10,334,794 B2
(45) Date of Patent: Jul. 2, 2019

(54) IRRIGATION IMPLEMENT

(71) Applicant: Millbrook Capital Management Inc., New York, NY (US)

(72) Inventors: Miguel Alvarado, Tres Pino, CA (US); John S. Dyson, Millbrook, NY (US); David H. Bova, Millbrook, NY (US)

(73) Assignee: Millbrook Capital Management Inc., New York, NY (US)

( * ) Notice: Subject to any disclaimer, the term of this patent is extended or adjusted under 35 U.S.C. 154(b) by 225 days.

(21) Appl. No.: 15/042,037

(22) Filed: Feb. 11, 2016

(65) Prior Publication Data
US 2017/0231172 A1    Aug. 17, 2017

(51) Int. Cl.
| | |
|---|---|
| *A01G 25/00* | (2006.01) |
| *A01G 25/02* | (2006.01) |
| *A01G 25/06* | (2006.01) |
| *B29C 57/10* | (2006.01) |
| *B29C 69/00* | (2006.01) |
| *B29K 105/00* | (2006.01) |

(52) U.S. Cl.
CPC ......... *A01G 25/023* (2013.01); *A01G 25/026* (2013.01); *A01G 25/06* (2013.01); *B29C 57/10* (2013.01); *B29C 69/001* (2013.01); *A01G 2025/006* (2013.01); *B29K 2105/258* (2013.01)

(58) Field of Classification Search
CPC ......... B05B 1/20; B29C 57/10; B29C 69/001; A01G 25/023; A01G 25/026; A01G 25/06
USPC ....................................................... 47/48.5
See application file for complete search history.

(56) References Cited

U.S. PATENT DOCUMENTS

| | | | | |
|---|---|---|---|---|
| 2,431,537 A | * | 11/1947 | Bogoslowsky | B29C 57/10 |
| | | | | 229/400 |
| 2,566,833 A | * | 9/1951 | Healy | A01G 25/02 |
| | | | | 239/266 |
| 2,649,196 A | * | 8/1953 | Arny | C05D 9/02 |
| | | | | 206/0.5 |
| 2,705,662 A | * | 4/1955 | Leonard, Jr. | A01G 25/02 |
| | | | | 239/110 |
| 2,802,530 A | * | 8/1957 | Kaufman | A01G 25/02 |
| | | | | 264/156 |
| 2,875,713 A | * | 3/1959 | Shoffner | A01G 29/00 |
| | | | | 111/7.1 |
| 2,905,282 A | | 9/1959 | Miller | |
| 3,199,784 A | * | 8/1965 | Chapin | A01G 27/001 |
| | | | | 239/450 |
| 3,199,791 A | * | 8/1965 | Chapin | A01G 27/008 |
| | | | | 239/450 |

(Continued)

FOREIGN PATENT DOCUMENTS

| | | | | |
|---|---|---|---|---|
| CH | 315668 A | * | 8/1956 | B29C 57/10 |
| DE | 2020198 A1 | * | 11/1971 | B29B 13/025 |

(Continued)

*Primary Examiner* — Magdalena Topolski
*Assistant Examiner* — Morgan T Barlow
(74) *Attorney, Agent, or Firm* — Dentons US LLP

(57) ABSTRACT

An irrigation implement including a member having a first end and a second end, the first and second ends both being positioned along a longitudinal axis of the member. The first end being open and the second end including a pinched seal. The member further defines an opening disposed toward the second end, and being configured to enable an irrigation tube to be attached to the opening such that the opening is sealed by the irrigation tube.

3 Claims, 3 Drawing Sheets

(56) References Cited

U.S. PATENT DOCUMENTS

Figure 1C:
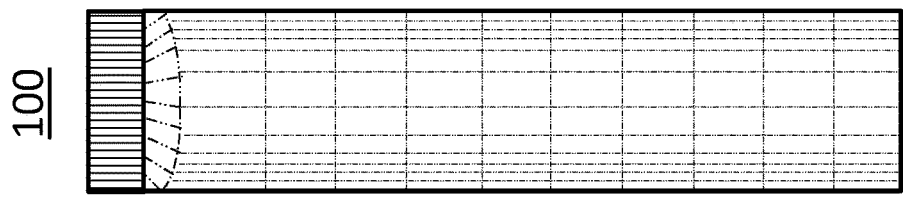

| | | | | |
|---|---|---|---|---|
| 3,304,653 | A | * | 2/1967 | Ludwik .............. A01K 63/006 119/268 |
| 3,361,359 | A | * | 1/1968 | Chapin ................ A01G 25/02 239/145 |
| 3,400,909 | A | | 9/1968 | Shettel |
| 3,552,654 | A | * | 1/1971 | Thomas ............... A01G 25/06 239/145 |
| 3,599,280 | A | * | 8/1971 | Rosenkranz .......... B29C 49/36 425/192 R |
| 3,628,225 | A | * | 12/1971 | Parker ................. B29C 57/10 102/530 |
| 3,672,571 | A | * | 6/1972 | Goodricke ............ A01G 25/02 239/145 |
| 3,752,633 | A | * | 8/1973 | Lundberg ............. B29C 31/002 425/343 |
| D228,385 | S | | 9/1973 | Ogilvie |
| 3,762,170 | A | * | 10/1973 | Fitzhugh ............. A01G 25/023 405/38 |
| 3,765,144 | A | * | 10/1973 | Schiesser ............ B29C 57/10 156/196 |
| 3,806,031 | A | | 4/1974 | Olson |
| 3,830,067 | A | * | 8/1974 | Osborn ................ A01G 25/06 156/193 |
| 3,851,896 | A | | 12/1974 | Olson |
| 3,873,031 | A | * | 3/1975 | Reeder ................ A01G 25/023 239/542 |
| 3,874,598 | A | * | 4/1975 | Havens ................ A01G 25/06 138/42 |
| 3,899,136 | A | * | 8/1975 | Harmony ............. A01G 25/023 239/533.13 |
| 4,021,061 | A | * | 5/1977 | Zimmerman ........ A01G 25/023 285/13 |
| 4,153,380 | A | * | 5/1979 | Hartman .............. A01G 25/06 405/39 |
| 4,162,041 | A | * | 7/1979 | Hane .................... A01G 25/02 239/266 |
| 4,166,580 | A | | 9/1979 | Meckel |
| 4,219,525 | A | * | 8/1980 | Greenspan ............ B29C 57/10 264/296 |
| 4,223,840 | A | * | 9/1980 | La Scala .............. A01C 23/047 239/207 |
| 4,578,897 | A | * | 4/1986 | Pazar ................... A01G 27/006 239/63 |
| 4,655,397 | A | | 4/1987 | Gorney |
| 4,887,386 | A | * | 12/1989 | Minshull .............. A01G 25/06 47/48.5 |
| 4,922,653 | A | * | 5/1990 | Stone .................... A01G 17/04 47/45 |
| 5,131,597 | A | * | 7/1992 | Bard ..................... A01G 25/02 239/145 |
| 5,203,082 | A | * | 4/1993 | Bontems .............. A01G 25/023 29/890.141 |
| 5,279,685 | A | * | 1/1994 | Ivansons .............. B29C 57/10 156/158 |
| 5,287,994 | A | * | 2/1994 | Dempsey ............. B67D 3/00 111/7.1 |
| 5,913,635 | A | * | 6/1999 | Graham ................ E02B 13/00 405/43 |
| 6,516,561 | B1 | * | 2/2003 | Mancini ............... A01C 23/027 47/42 |
| 6,732,951 | B1 | * | 5/2004 | Salazar ................. A01G 9/24 239/209 |
| 6,901,643 | B1 | * | 6/2005 | Krasner ................ B25B 7/02 29/268 |
| 7,862,254 | B2 | * | 1/2011 | Jin Hyun ............. A01G 27/006 239/63 |
| D674,255 | S | | 1/2013 | Evans |
| D701,987 | S | | 4/2014 | Ransom et al. |
| D709,994 | S | | 7/2014 | King et al. |
| 8,979,431 | B2 | | 3/2015 | Bayley |
| 9,307,705 | B2 | | 4/2016 | Akritanakis |
| D758,896 | S | | 6/2016 | Caldwell |
| D758,897 | S | | 6/2016 | Caldwell |
| D778,410 | S | | 2/2017 | Smith et al. |
| D783,132 | S | | 4/2017 | Smith et al. |
| D791,559 | S | | 7/2017 | DeCamp |
| 2002/0017575 | A1 | * | 2/2002 | Andrews ............... B05B 1/14 239/337 |
| 2003/0077123 | A1 | * | 4/2003 | Moulton ............... A01G 25/06 405/51 |
| 2004/0089738 | A1 | * | 5/2004 | Heren ................... A01G 25/02 239/271 |
| 2006/0196977 | A1 | * | 9/2006 | Hashimshony ...... A01G 25/023 239/542 |
| 2007/0158472 | A1 | * | 7/2007 | Calhoun ............... B05B 1/20 239/464 |
| 2007/0243019 | A1 | * | 10/2007 | Baker ................. A01G 13/0268 405/36 |
| 2007/0274783 | A1 | * | 11/2007 | Hibbard ............... A01G 29/00 405/43 |
| 2008/0210785 | A1 | | 9/2008 | Hou et al. |
| 2008/0271366 | A1 | * | 11/2008 | Thompson ............ A01G 25/02 47/9 |
| 2008/0282609 | A1 | * | 11/2008 | Nelson ............... A01G 13/0268 47/48.5 |
| 2010/0176216 | A1 | | 7/2010 | Cheung |
| 2010/0284744 | A1 | * | 11/2010 | Ohlin ................... A01G 25/06 405/49 |
| 2012/0107048 | A1 | | 5/2012 | Agadi |
| 2013/0269247 | A1 | | 10/2013 | Kostic |
| 2013/0272791 | A1 | | 10/2013 | Bayley |
| 2014/0021273 | A1 | * | 1/2014 | Turk ..................... A01G 25/02 239/542 |
| 2014/0042236 | A1 | * | 2/2014 | Lembo, III ............ B05B 12/02 239/1 |
| 2014/0283445 | A1 | | 9/2014 | Chabot |
| 2015/0013220 | A1 | | 1/2015 | Ross |
| 2015/0090815 | A1 | | 4/2015 | Akritanakis |
| 2015/0181820 | A1 | | 7/2015 | Crook |
| 2016/0073595 | A1 | * | 3/2016 | Smith ................... A01G 25/02 239/1 |
| 2017/0231172 | A1 | | 8/2017 | Alvarado |

FOREIGN PATENT DOCUMENTS

| | | | | | |
|---|---|---|---|---|---|
| FR | 1083422 | A | * | 1/1955 | ............ B29C 57/10 |
| GB | 752221 | A | * | 7/1956 | ............ B29C 57/10 |
| GB | 973621 | A | * | 10/1964 | ............ B29C 57/10 |
| GB | 1099064 | A | * | 1/1968 | ............ A63H 33/22 |
| GB | 1174437 | A | * | 12/1969 | ............ B29C 57/10 |
| JP | 59127719 | A | * | 7/1984 | |

* cited by examiner

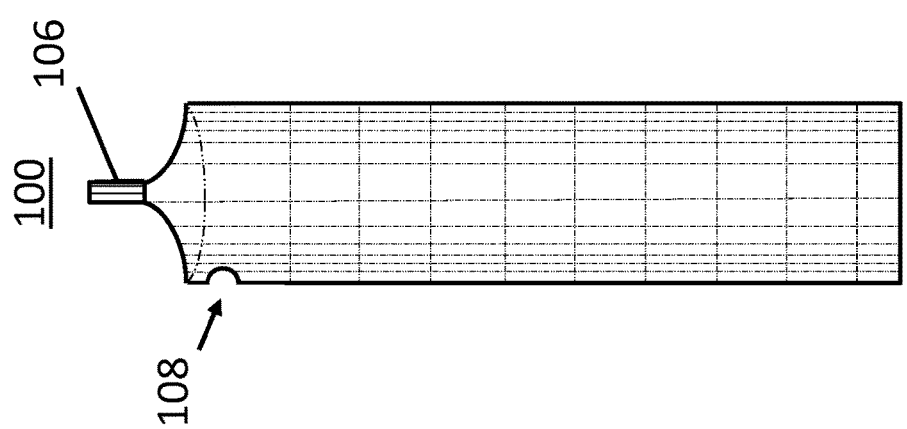
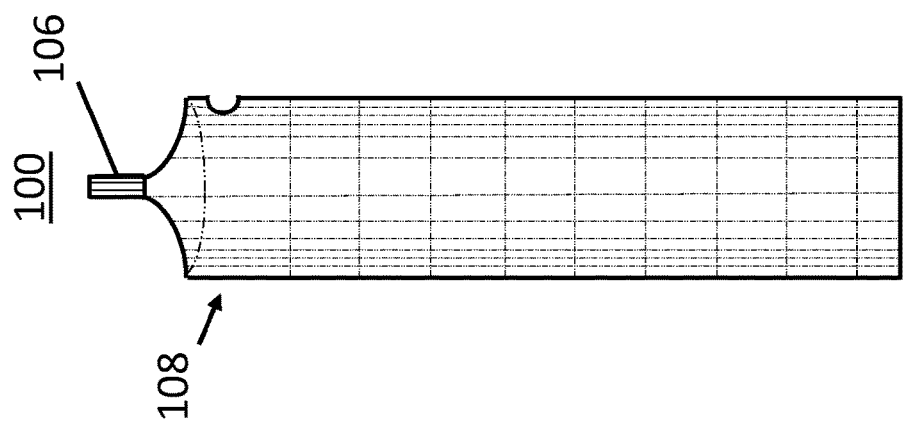
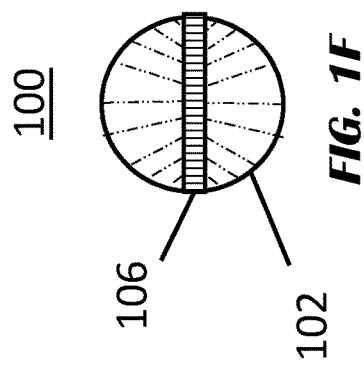
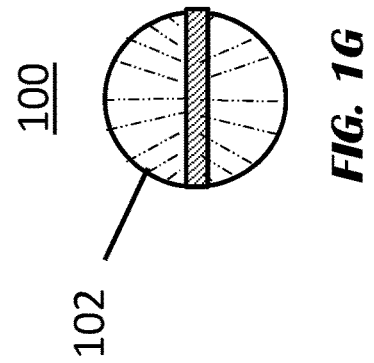

IRRIGATION IMPLEMENT

BACKGROUND

Irrigation, especially in dry or arid geographies, is particularly important to commercial plant and tree growers, such as wineries. Wineries, and other commercial growers, may have thousands of plants located on several or many acres. As commercial growers are faced with the cost of water, there is a need to be efficient with irrigation of plants and trees, such as grapevines. And, in the case of growing plants in drought stricken areas, such as California, avoiding evaporation of water while irrigating the plants is very desirable.

Commercial growers may need miles of irrigation "spaghetti" tubing, thousands of connectors and fittings, and thousands of irrigation implements to irrigate individual plants and trees on a property. The cost of the irrigation implements on a per unit basis may have a significant impact in profitability for growers. If, for example, 5,000 irrigation implements are needed for a winery, the cost for the irrigation implements may be cost prohibitive.

Different irrigation implements or mechanisms have different configurations. Some irrigation implements have a tapered portion or spike member at the bottom to form an irrigation stake with openings or emitters along the sides of the irrigation stake to enable water to saturate soil surrounding the irrigation stake to water roots of a plant or tree. The problems with the irrigation stake are that (i) manufacturing costs are high because of the multiple sections and assembly required to produce the irrigation stake, (ii) the water can saturate soil areas not necessarily desirable, and (iii) emitters both below and above the surface of the soil in which the irrigation stakes are positioned may allow moisture to more easily evaporate from the soil and irrigation stake.

One existing commercially available irrigation is an irrigation stake formed of plastic material, and can cost two dollars or more per unit. The irrigation stake is over 2 feet long. In operation, the irrigation stake is driven into the ground near a plant or tree. A water tube is inserted into the stake to cause water to enter the stake that then leaks water through emitters or openings at the bottom of the stake into the soil. Because the stake has many emitters, evaporation may occur or water may leak into soil that unnecessarily receives the water.

Another type of irrigation implement includes a flexible, spongy material that is about 18 inches long and extends from an irrigation tube. This irrigation implement provides for releasing water along the spongy material. However, the spongy material, when buried in the soil proximate a plant or tree, may become clogged with biological matter, and evaporation from the spongy material may also be restricted. Because of the configuration of the spongy material, water is released along the length of the spongy material, and, therefore, may release in soil locations that are unnecessary and will evaporate more readily than desirable. Moreover, manufacturing the irrigation mechanism requires assembly to fixably attach an irrigation tube to the spongy material, thereby increasing cost of the irrigation implement. To install the irrigation implement, the flexible, spongy material has to be buried, which can be time consuming and difficult to avoid crimping or otherwise damaging the flexible, spongy material. Hence, an irrigation implement that (i) is low cost, (ii) increases watering efficiency (e.g., better water placement in the soil and reduced evaporation), and (iii) is easy to install is needed.

SUMMARY

A low-cost, hi-efficiency irrigation implement may provide commercial growers with a better option for irrigating plants than existing irrigation implements. The irrigation implement may be a single element formed from common plastic irrigation tubing. Alternatively, non-plastic material may be utilized. The irrigation implement may include an open end and a self-sealed end. An emitter or opening through which an irrigation "spaghetti" tube or other similarly sized irrigation tube may be connected and/or inserted may be utilized. The emitter may be sized such that the irrigation tube or adapter may have a friction fit, thereby sealing the opening such that evaporation from the irrigation implement is minimized.

One embodiment of an irrigation implement may include a member having a first end a second end. The first end may be open and the second end may include a pinched seal. The member may further define an opening disposed toward the second end, and be configured to enable an irrigation tube to be attached to the opening such that the opening is sealed by the irrigation tube.

One embodiment of a method of manufacturing an irrigation implement may include receiving tubing. The tubing may be conventional plastic irrigation tubing. The tubing may be cut to form a first end of an irrigation implement. The tubing may be cut to form a second end of the irrigation implement. Either the first end or the second end of the irrigation implement may be pinched, and the pinched end of the irrigation implement may be sealed.

BRIEF DESCRIPTION

Figure 1B:
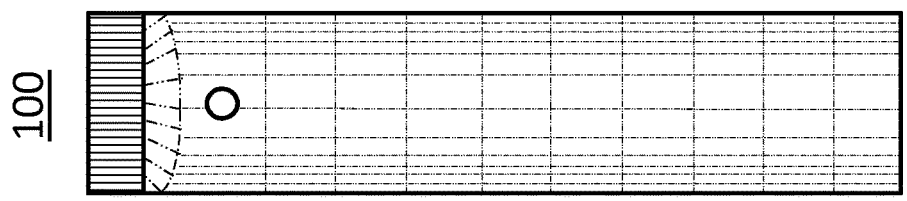
Figure 1A:
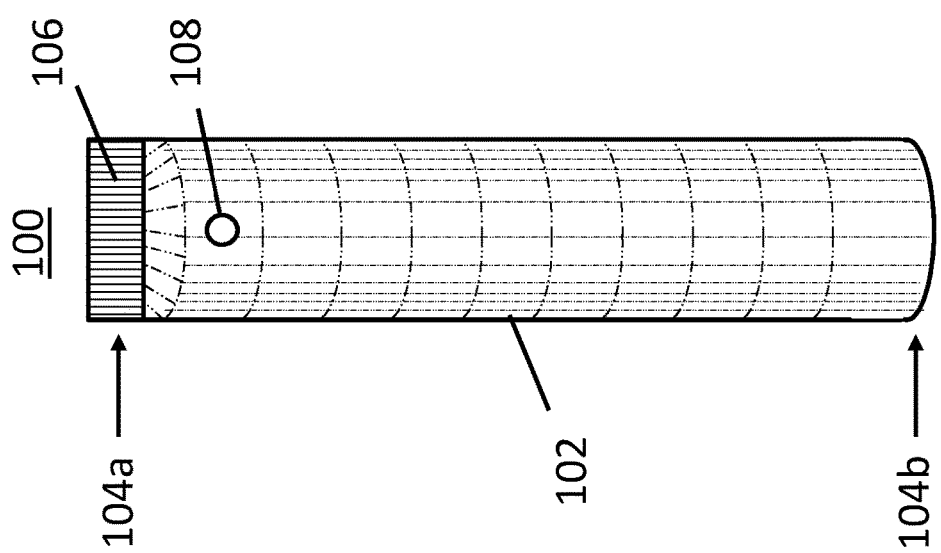
Figure 2:
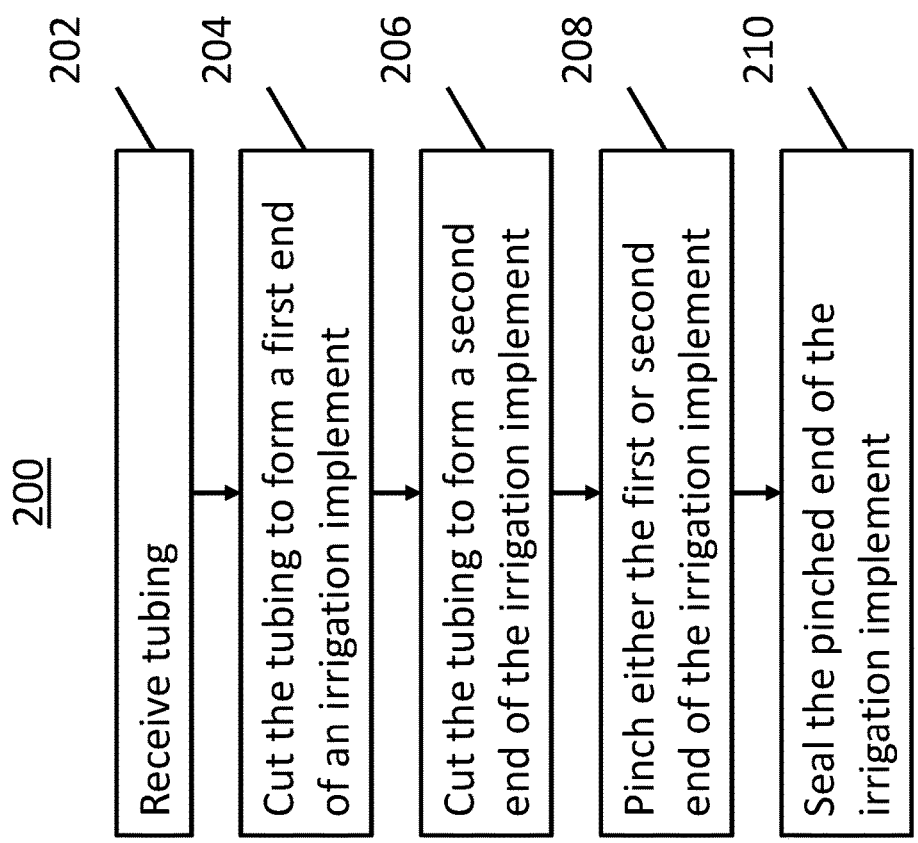

A more complete understanding of the method and apparatus of the present invention may be obtained by reference to the following Detailed Description when taken in conjunction with the accompanying Drawings wherein:

FIGS. 1A-1G are illustrations are different views of an illustrative irrigation implement for irrigating plants or trees; and FIG. 2 is a method of manufacturing the irrigation implement of FIG. 1.

DETAILED DESCRIPTION OF THE DRAWINGS

With regard to FIGS. 1A-1G, illustrations of an illustrative irrigation implement 100 are shown. FIG. 1A-1G are respectively orthogonal, front, rear, left, right, top, and bottom views of the illustrative irrigation implement 100. The irrigation implement 100 includes a member 102 including a first end 104a and a second end 104b. The first end 104a and the second end 104b are formed by cutting tubing, such as irrigation tubing mounted on a spool or otherwise, into irrigation implement sections having lengths of between 6 inches to about 12 inches. Other lengths for the irrigation implement 100 may be used, as well. The irrigation implement 100 may be ½ inch to 1 inch in diameter. Alternative diameters may be used depending on the nature of the usage, such as different aged plants or trees. The irrigation implement 100 may be composed of plastic, rubber, or any other material capable of enduring environmental and weather elements where being utilized. The irrigation implement 100 may be any color, as well. The dashed lines and curves shown are indicative of curvature of the irrigation implement 100.

The first end 104a of the irrigation implement 100 is cut and has the same diameter as the irrigation implement 100.

The second end 104b may be pinched to form a seal region 106. In one embodiment, the seal region 106 may be heat sealed, where the material of the member 102 is heat sealed to itself or self-sealed by heating the seal region 106 and pressing the two sides against one another until the two sides melt together. In an alternative embodiment, a sealing material, such as glue, epoxy, or otherwise, may be used to seal the second end 104b of the implement 100 using a pinched or unpinched technique prior to or during the sealing process.

In an alternative embodiment, rather than pinching and sealing the irrigation implement 100, a cap (not shown) or stopper member (not shown) may be applied to the second end 104b of the irrigation implement 100. The cap or stopper member adds another component to form the irrigation implement, but eliminates the sealing step. In either case, the irrigation implement may be utilized in the same manner.

As shown, an emitter 108 is included toward the second end 104b of the member 102. The emitter 108 is shown to be circular, and configured to provide for a certain number of gallons per hour of water to be leaked if used as a conventional emitter. However, the irrigation implement 100 is to use the emitter 108 as an input to receive an irrigation "spaghetti" tube or other irrigation tube that is capable of fitting into the emitter to form a friction fit. Alternatively, an adapter (not shown) may be configured to fit into the emitter on one side and receive an irrigation tube on the other side so as to supply water into the irrigation implement 100. The emitter 108 is shown to be located toward the second end 104b of the implement so that an irrigation tube can be connected or inserted into the emitter 108 when in operation (e.g., when the first end 104a is inserted into soil). In one embodiment, the emitter 108 may be located within 3-inches of the first end 104a. In another embodiment, the emitter 108 may be located within 1-inch of the first end 104a.

It should be understood that the dimensions and scale of the irrigation implement 100 are illustrative, and that alternative dimensions and scaling may be utilized to provide for the functionality described herein. It should further be understood that alternative shapes for the irrigation implement 100 may be utilized, including additional decorative features, such as different shapes of the member (e.g., inclusive of a waist, profile of a person, profile of a tool, or any other geometric or non-geometric shape), different shapes of the seal region 106 (e.g., "V" shape, "U" shape, wave shape, etc.), and different shapes of the second end (e.g., wave shape, multiple "V shape, etc.).

With regard to FIG. 2, a flow diagram of a process 200 of manufacturing the irrigation implement of FIG. 1 is shown. The process 200 of manufacturing an irrigation implement may start at step 202, where irrigation tubing may be received. The tubing, and thus the implement, may be plastic, rubber, or any other material. The tubing may be irrigation tubing (i.e., tubing specifically designed for irrigation), and be received in bulk (e.g., 500 feet or more) from a spool or otherwise. In receiving the tubing from a spool, the tubing may be manually, semi-automatically, or automatically fed from the spool (or other device) for processing (e.g., pinching, cutting, and sealing). In an alternative embodiment, smaller lengths, including individual lengths (e.g., 9 inches) or multiple lengths (e.g., 18 inches) of a single irrigation implement may be received for processing to form the irrigation implement. If the tubing is semi-automatically or automatically fed from the spool, the tubing may be received from the spool in a synchronous or coordinated manner with other processing steps, such as a pinching process, for manufacturing the irrigation implement.

Although not specifically shown in FIG. 2, one or more steps may be included to form (e.g., punch) emitters or openings in the tubing if the bulk tubing does not already include the emitters. In one embodiment of the tubing, emitters or openings may be periodically spaced along the tubing. For example, the emitters may be regularly spaced every 6-inches, 9-inches, 12-inches, or otherwise. The emitters may be sized for a certain number of gallons per hour (GPH), such as 1 GPH, such that the emitter, in this case, may receive irrigation "spaghetti" tubing or other appropriately sized irrigation tubing with a friction fit. Alternatively, an adapter may be used to adapt or provide a bridge for the irrigation "spaghetti" tubing or other irrigation tubing to the irrigation implement.

The tubing may be cut to form a first end of an irrigation implement at step 204. If the tubing has regularly spaced emitters, then the first cut may be made slightly above the regularly spaced emitter, such as between 1-inch and 3-inches, or second cut may be made slightly below the emitter, depending on the configuration of the manufacturing equipment. At step 206, the tube may be cut to form a second end of the irrigation implement. Either the first end or the second end of the irrigation implement may be pinched at step 208, depending on whichever is closer to the emitter, and sealed at step 210.

In sealing the pinched end of the irrigation implement, when the tubing is being pinched or just prior to the tubing is pinched, heat may be applied to cause the material of the second end to melt and form a seal. In one embodiment, the pinching and sealing at step 208 and 210 may be performed simultaneously through use of a heated press inclusive of a cutter. In one embodiment, the sealing may be performed for two irrigation implements in a row, and a cut within the seal to separate the two irrigation implements may be made. Although shown as multiple steps, it should be understood that two or more of the steps may be combined into a single step. For example, steps 206, 208, and 210 may be combined into a single step of cutting, pinching, and sealing the tube. It should further be understood that the order of the steps in FIG. 2 may be varied. For example, the process 200 may include pinching, sealing, and cutting the hose from a spool in a single step. Alternatively, two steps to perform the functions of pinching, sealing, and cutting may be utilized.

In cutting the ends of the irrigation implement, the cutter may be a blade, saw, heated element, laser, or any other device capable of cutting the tube. As described herein, the process 200 may be performed in a fully automated, semi-automated, or manual manner. In one embodiment, a cutter machine may be performed independent of a press machine and heater machine. Alternatively the press machine and heater machine may be a single machine. Still yet, a single machine capable of cutting, pressing or pinching, and heating to seal the irrigation implement may be utilized. In one embodiment, one, two, or more irrigation implements may be produced simultaneously using a single tubing.

Depending on the number of simultaneously produced irrigation implements, the tubing may have a certain pattern of emitters such that, for example, a pair of irrigation implements may have first ends or second ends head-to-head or at opposite ends from one another. In other words, the emitters may be positioned with a regular spacing or pairs of emitters may be positioned with a regular spacing and a pinched seal may be made between the pair of emitters. In whatever configuration of equipment that is used to produce individual irrigation implements, irrigation tubing may be used in bulk with emitters as conventionally available or specially made to meet the production capabilities for producing the irrigation implements.

In the event of the tubing not having emitters that are regularly spaced, an opening may be formed in the irrigation implement toward the pinched end. The opening may be located within 3-inches of the pinched end. In another embodiment, the opening may be within 1-inch of the pinched end. The opening may be formed by a punch, drill, heated element, laser, or other device, and formed toward the pinched end or toward the end that is going to be pinched. Other techniques may be used for creating an opening in the irrigation implement. The opening may be circular or any other shape. The opening may be sized to fit a standard irrigation tube that is to be friction fit within the opening. In an alternative embodiment, the opening may be sized and shaped to fit an adapter that may engage with an irrigation tube.

In operation, the irrigation implement may be inserted into soil near a plant or tree. In one embodiment, the irrigation implement may be utilized for irrigating plants or trees in a second or later season of production. Because the irrigation implement has an opening at the bottom and one opening that is sealed toward the top, evaporation from the irrigation implement is minimal or none. Moreover, because the water that enters the irrigation implement is released from the bottom, the irrigation can be limited to a specific location in the soil, so evaporation may be reduced.

Utilizing the processes described herein, the cost of manufacturing may be significantly lower than conventional irrigation implements, such that the retail price of the irrigation implements may be less than one-quarter of conventional irrigation implements.

Although the irrigation implement has been described as being tubular, it should be understood that the irrigation implement may be formed with a variety of profile shapes, include square, rectangular, or any other geometric shape. Because tubular irrigation plastic material is currently produced in bulk, the cost of producing irrigation implements using tubular shapes may be lower than other shaped irrigation devices.

The previous description is of a preferred embodiment for implementing the invention, and the scope of the invention should not necessarily be limited by this description. The scope of the present invention is instead defined by the following claims.

What is claimed:

1. A method of irrigating crops, comprising:
    attaching an irrigation tube to a singular tubular member consisting of:
        a first end; and
        a second end opposite the first end along a longitudinal axis of the member, the second end includes a heated pinched seal,
        the member further defining a circular first opening disposed entirely along a longitudinal-oriented portion of a sidewall toward the second end,
        wherein the first end defines a second opening having the same inner diameter as the inner diameter of the member extending between the first opening and the first end along the longitudinal axis;
    the attachment causing the first opening to be sealed by the irrigation tube; and
    providing water from the irrigation tube via the first opening to the member such that water free-flows from the second end to the first end into the ground to irrigate roots of the crops.

2. The method of irrigating crops according to claim 1, wherein attaching the singular tubular member includes attaching the singular tubular member comprised of plastic.

3. The method of irrigating crops according to claim 2, wherein attaching the singular tubular member includes attaching the singular tubular member with the inner diameter being 1.27 cm (½ inches).

* * * * *